United States Patent Office 2,816,229

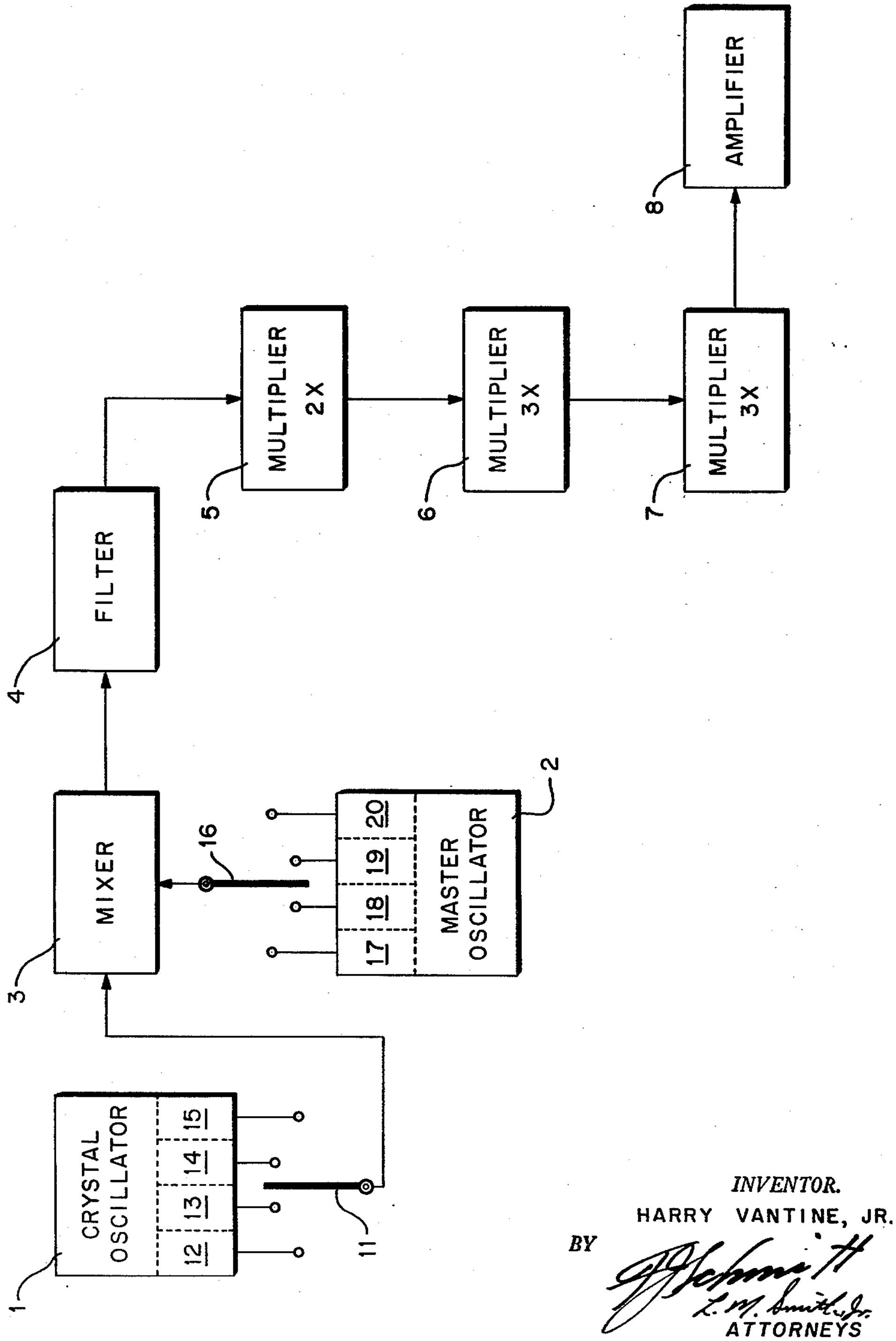
INVENTOR.
HARRY VANTINE, JR.
BY
ATTORNEYS

Patented Dec. 10, 1957

2,816,229

CRYSTAL SAVING ARRANGEMENT FOR MULTI-CHANNEL HIGH FREQUENCY ELECTRONIC EQUIPMENT

Harry Vantine, Jr., Philadelphia, Pa.

Application April 8, 1955, Serial No. 500,318

1 Claim. (Cl. 250—36)

(Granted under Title 35, U. S. Code (1952), sec. 266)

The invention described herein may be manufactured and used by or for the Government of the United States of America for governmental purposes without the payment of any royalties thereon or therefor.

The present invention relates to a crystal saving arrangement for stable multi-channel high frequency electronic equipment, and more particularly to a crystal saving method and arrangement in which a stable crystal oscillator is utilized to establish a suitable basic frequency, and a local oscillator, of lesser stability, is utilized to add the small increments of frequency necessary to provide the large number of frequency channels.

Present arrangements for stable multi-channel high frequency electronic equipment use either a single crystal for each distinct channel, or a combination of crystal oscillators where the frequencies are selected in combination to give the desired number of channels. In the first of these systems a large number of crystals is required; and where, by way of example, 300 channels are required, the cost and complexity of such a system is prohibitive. In the second of these systems, more tube stages are required with the consequence of less reliability. In other types of equipment there is utilized non-crystal controlled circuitry involving master oscillators and multipliers, the frequencies of which are continuously compared with crystal oscillators and corrected by reactant tubes to the proper value. Such equipment has not been too successful in use because they are usually more complex than the crystal controlled systems.

The purpose of this invention is to save crystals in multi-channel equipment without sacrificing either the number of available channels or the stabilization of the frequencies. Specifically, the problem in mind is to obtain as many as 300 highly stabilized frequency channels for a communication set between 230 and 260 megacycles, however, the invention as set forth below, is not limited in utility to these ranges.

In practicing the instant invention, a single crystal oscillator is employed for a group of channels, upwards of 20, for example. The crystal oscillator of well known design operates at a frequency of the order of 10 megacycles and above. A master oscillator is provided for delivering frequencies of the order of 100 kilocycles. The master oscillator, of conventional construction, is provided with a variable condenser with detent stops to provide frequencies in steps of approximately 5 or 6 kilocycles, although the size of the steps may be varied considerably for particular circumstances. Therefore, when the frequency delivered by the master oscillator is mixed and added to the frequency delivered by the crystal oscillator, the over-all accuracy of the frequency delivered after mixing is of the order of accuracy of the crystal oscillator rather than the order of accuracy of the master oscillator due to the relative values of the frequencies delivered by the crystal and the master oscillators.

An object of the present invention is the provision of multi-channel electronic equipment in which a single crystal oscillator is used for stabilizing a large number of channels.

Another object of the invention is the provision of apparatus for establishing a number of highly stable closely spaced frequency channels by the addition of relatively low stability frequency increments to a crystal controlled high stability frequency.

A further object is to provide means for maintaining a large number of high frequency channels which are stable, using a minimum of crystals.

Still another object of this invention is the provision of means for combining relatively low stability increments to a crystal controlled high stability frequency to produce a number of highly stable closely spaced frequency channels.

The present invention will be more fully understood by reference to the following detailed description which is accompanied by a drawing showing a preferred embodiment of the invention.

The drawing shows a block diagram of a portion of a transceiver utilizing this scheme for establishing the discrete channels. This arrangement is designed to meet more particularly the problem of obtaining 300 highly stabilized frequency channels for a communication set operating between 230 and 260 megacycles. A 40 megacycle I. F. frequency is chosen for the receiver and, therefore, the stabilized frequency channels to be obtained, chosen on the low side, are 190 to 220 megacycles. A frequency stability of 10 kilocycles is required with a channel spacing of 100 kilocycles.

On the drawing, reference numeral 1 designates a crystal oscillator assembly which produces a stable frequency of the order of 10 megacycles. A plurality of crystals 12–15 may be used for obtaining various frequencies in this range, switch 11 providing for selectively engaging the respective crystals. A master oscillator assembly 2 of conventional design is provided, starting a some frequency under 100 kilocycles with a tuning element such as a variable condenser with detent stop units 17—20 selectively engaged by a switch 16 for causing the master oscillator to be set at succeeding 5.55 kilocycle steps. Up to as many as 10, 15 or 20 steps can be provided. The unit identified by reference numeral 3 comprises a mixer of known type which mixes the output frequencies from oscillators 1 and 2. The filter 4 is a type well known in the art, which chooses the frequency desired from the output of the mixer 3, which in this case, is the sum frequency of the two frequencies being mixed, the sum being defined as either the mathematical sum or difference of the two frequencies. The reference numerals 5, 6 and 7 designate frequency multipliers which, in this case, multiply the output frequency of filter 4 by a total of 18 times to give 100 kilocycle spacing of output frequencies for 5.55 kilocycles step changes in block 2.

Assuming that master oscillator 2 contains a starting frequency of 55.0 kilocycles and the frequency to be delivered by the amplifier 8 is to be 190 megacycles, as explained above, the size of the crystal oscillator may be easily calculated. For example, 190 mc. divided by the total multiplier ratio 18 is calculated to be 10,555 kilocycles which in effect is the sum of the frequencies delivered by block 1 and block 2. With master oscillator 2 delivering at its lowest frequency, a frequency of 55 kilocycles, then crystal oscillator 1 must be designed for the delivery of 10,500 kilocycles, or 10.5 mc.

Considering crystal oscillator 1 operating at a frequency of 10.5 mc., and master oscillator 2 having detent stops beginning at a frequency of 55 kilocycles and with 5.55 kilocycle steps bringing about kc. increments of 55.0, 60.55, 66.10, etc., the number of channels being stabilized by the single crystal oscillator 1 is limited only by the number of steps provided in master oscillator 2. It has been found to be most feasible to limit master oscillator 2 to 20 steps. By providing crystal oscillator 1 with conventional means for switching to several crystals, each used as the basic frequency source for any number of channels, the number of channels which can be produced by the simple arrangement shown in the drawing is multiplied to a large number. In the present problem, in order to obtain 300 highly stabilized frequency channels, having master oscillator 2 operating with 20 steps for each crystal in oscillator 1, a total of only 15 crystals is required for producing the necessary 300 channels, as compared to 300 crystals where one crystal is used for each channel.

It should be noted that with crystal oscillator 1 operating in the order of 10 megacycles and master oscillator 2 operating in the order of 100 kilocycles, the effect of the comparatively unstable master oscillator on the final signal is negligible compared to the effect of the crystal oscillator 1 which is relatively stable. This means, in effect, that it is the stability of crystal oscillator 1 which determines the stability of the final frequency produced and not the relative instability of the frequency delivered by master oscillator 2.

From the above description it is obvious that this invention is not limited to the particular frequency ranges mentioned, provided the order of magnitude of the two oscillators is different. It should be understood, therefore, that the foregoing disclosure relates to only a preferred embodiment of the invention and numerous modifications or alternations may be made therein without departing from the spirit and the scope of the invention as set forth in the appended claim.

What is claimed is:

In a transceiver, crystal oscillator means having a plurality of crystals in said oscillator means capable of producing frequencies in the very high frequency range and means for selectively engaging one of said crystals to produce a first frequency of relatively high stability, master oscillator means for generating a finite number of preselected frequencies in the low frequency range including means to select a second frequency therefrom, mixer means to mix said first and second frequencies from said crystal oscillator means and said master oscillator means, respectively, to produce a sum frequency, filter means to pass through said sum frequency, means to multiply said sum frequency passing through said filter means, and amplifier means to amplify the output of said multiplier means to establish a relatively high number of very stable, closely spaced frequency increments which may be selected with a relatively small number of crystal frequency energy generating elements.

References Cited in the file of this patent

UNITED STATES PATENTS

| | | |
|---|---|---|
| 2,416,791 | Beverage | Mar. 4, 1947 |
| 2,567,860 | Shapiro | Sept. 11, 1951 |
| 2,666,140 | Wallace | Jan. 12, 1954 |
| 2,666,141 | Clapp et al. | Jan. 12, 1954 |
| 2,679,005 | Bataille et al. | May 18, 1954 |